United States Patent [19]

Mital

[11] Patent Number: 5,664,228
[45] Date of Patent: Sep. 2, 1997

[54] PORTABLE INFORMATION DEVICE AND SYSTEM AND METHOD FOR DOWNLOADING EXECUTABLE INSTRUCTIONS FROM A COMPUTER TO THE PORTABLE INFORMATION DEVICE

[75] Inventor: Amit Mital, Kirkland, Wash.

[73] Assignee: Microsoft Corporation, Redmond, Wash.

[21] Appl. No.: 512,823

[22] Filed: Aug. 9, 1995

[51] Int. Cl.$^6$ .......................... G06K 19/07; G06F 13/00
[52] U.S. Cl. .......................... 395/882; 395/822; 395/833; 395/280; 395/281; 395/893; 235/380; 235/492; 360/133; 360/31; 361/686
[58] Field of Search .................................. 395/822, 833, 395/280, 287, 893; 235/380, 492; 360/133, 31; 361/686, 484

[56] References Cited

U.S. PATENT DOCUMENTS

| | | | |
|---|---|---|---|
| 4,504,871 | 3/1985 | Berwick et al. | 360/31 |
| 5,159,182 | 10/1992 | Eisele | 235/492 |
| 5,224,216 | 6/1993 | Gordon et al. | 395/822 |
| 5,321,817 | 6/1994 | Feinstein | 395/280 |
| 5,338,923 | 8/1994 | Grieu | 235/492 |
| 5,457,590 | 10/1995 | Barrett et al. | 360/133 |
| 5,471,038 | 11/1995 | Eisele et al. | 235/380 |
| 5,497,464 | 3/1996 | Yeh | 395/200.01 |
| 5,517,407 | 5/1996 | Weiner | 364/419.01 |
| 5,522,089 | 5/1996 | Kikinis et al. | 395/893 |
| 5,533,125 | 7/1996 | Bensimon et al. | 390/4 |
| 5,559,672 | 9/1996 | Buras, Jr. et al. | 361/484 |
| 5,584,043 | 12/1996 | Burkart | 395/882 |
| 5,590,192 | 12/1996 | Lovett et al. | 380/4 |
| 5,590,377 | 12/1996 | Smith | 395/842 |
| 5,596,728 | 1/1997 | Belmont | 395/281 |
| 5,608,608 | 3/1997 | Flint et al. | 361/686 |

FOREIGN PATENT DOCUMENTS 40 36 336 A1  5/1992  Germany ................ G11B 5/127

OTHER PUBLICATIONS

Microsoft Preess, Computer dictionary 2nd Edition, p. 295, Definitions of PCMCIA, PCMCIA Connectork, and PCMCIA Slot 1993.

Primary Examiner—Christopher B. Shin
Attorney, Agent, or Firm—Lee & Hayes, PLLC

[57] ABSTRACT

A system is provided to exchange information between a computer and a programmable portable information device (PID) using a standard memory drive, such as a 3.5" disk drive or a PCMCIA port. The PID has a protective encasing with a form factor that is physically compatible with the computer memory drive. In one embodiment, the portable information device has the form factor of a 3.5" memory diskette, while in another embodiment, the portable information device has a form factor of a PCMCIA card. The portable information device includes a keypad and a flat panel display provided on the exterior of the protective encasing, but within the form factor so as not to interrupt the insertion of the portable information device into the memory drive. The uniquely configured portable information device can be inserted into or removed from a standard computer memory drive. When inserted, communication between the portable information device and computer is automatically initiated. The PID receives executable instructions and/or data from the computer via the computer memory drive and transfers other data back to the computer in the same way. This permits the computer and PID to simultaneously update each other's data with the most recent scheduling information. When removed, the PID has its own power supply and is operable to organize tasks, remind the user of important dates, and perform any other functions of a personal organizer. The user can enter information using the keypad, or read scheduling information on the flat panel display.

15 Claims, 8 Drawing Sheets

PORTABLE INFORMATION DEVICE AND SYSTEM AND METHOD FOR DOWNLOADING EXECUTABLE INSTRUCTIONS FROM A COMPUTER TO THE PORTABLE INFORMATION DEVICE

TECHNICAL FIELD

This invention relates to personal electronic portable information devices. This invention also relates to systems and methods for downloading executable instructions from a computer to such portable information devices.

BACKGROUND OF THE INVENTION

In recent years, there has been an increasing use of compact, pocket-size electronic personal organizers that store personal scheduling information such as appointments, tasks, phone numbers, flight schedules, alarms, birthdays, and anniversaries. Some of the more common electronic organizers are akin to hand-held calculators. They have a full input keyboard with both numeric keys and alphabet keys, as well as special function keys. The organizers also have a liquid crystal display (LCD) which often displays full sentences and rudimentary graphics.

Apart from personal organizers, it is common for many people to maintain appointment calendars and task lists on their desk-top personal computers. One example time management software is Microsoft's® Schedule+™ for Windows™ which maintains daily appointment schedules, to-do lists, personal notes, and calendar planning. This information is often a duplicate of that maintained on the portable personal organizer.

People who electronically maintain their schedules often enter the same information two different times: once into their personal computer and once into their portable personal organizer. This repetitive effort is inconvenient and affords more opportunity for error. Additionally, there is a risk of incorrectly entering conflicting schedules. For example, the personal computer might show a meeting with a client at 8:00 am, while the portable personal organizer might indicate that the same meeting is at 3:00 pm. To avoid this situation, careful planners are required to meticulously enter the data into both the computer and personal organizer and then double-check each entry to ensure the accuracy of the dual scheduling system.

Accordingly, it would be nice if a person only had to enter his/her schedule once, say into the computer, and then have the data automatically downloaded to the personal organizer. One approach to accomplishing automatic data transfer is to interconnect the computer and personal organizer using a physical cord or conductor. For instance, a serial RS232 cable can be used to connect the serial port of the computer with a specially configured I/O port on the personal organizer. In this manner, data entered into the computer can be electronically transferred to the personal organizer over the serial cable. While this system reduces the opportunity for entry error, it is inconvenient because the user must either carry a cable along with the personal organizer or leave the cable with a specific computer and only load information from that computer. Accordingly, it is desirable to provide a wireless communication system that is not reliant on a cable interface.

One wireless technique for automatically loading data into a personal organizer involves technology introduced by Timex Corporation of Middlebury, Conn., which facilitates data transfer from a personal computer to an electronic watch. In recent years, electronic watches have evolved to the point that they can function as personal organizers. Like the pocket-size devices described above, such watches can be programmed with certain key appointments, tasks, phone numbers, flight schedules, alarms, birthdays, and anniversaries. In comparison to pocket-size personal organizers, however, it is difficult to enter data into a watch. This difficulty is due in large part to the limited number of input buttons and display characters available on reasonably-sized watches. Most watches are limited to having only three or four input buttons. A wearer programs a watch by depressing one or more buttons several times to cycle through various menu options. Once an option is selected, the user depresses another button or buttons to input the desired information. These input techniques are inconvenient and difficult to remember. Such techniques are particularly inconvenient when a wearer wishes to enter an entire month's schedule. Although watches have been made with larger numbers of input keys, such watches are usually much too large for comfort, and tend to be particularly unattractive.

To overcome the inconvenience of entering data to a watch, Timex devised its Data-Link™ watch which can be programmed using optical data transmission. The face of the watch has an optical sensor which is connected to a digital serial receiver, better known as a UART (universal asynchronous receiver/transmitter). The watch expects to receive a serial bit transmission in the form of light pulses at a fixed bit rate. A pulse represents a binary '0'bit, and the absence of a pulse represents a binary '1'bit. In the Data-Link™ system, the CRT (cathode ray tube) or other scanned-pixel display of a personal computer is used to provide light pulses to the watch. Although it appears to a human viewer that all pixels of a CRT are illuminated simultaneously, the pixels are actually illuminated individually, one at a time, by an electron beam which sequentially scans each row of pixels beginning with the top row and ending with the bottom row. It is this characteristic of a CRT and of other scanned display devices which is utilized to transmit serial data to the Data-Link™ watch.

While the CRT-based method has proven effective, it employs rather complicated transmission and timing schemes to ensure that the lines displayed on the CRT are interpreted as pulses by the watch's UART. For example, the watch is set to receive data at a fixed rate of, say, approximately 2K baud. However, the pace at which an electron beam scans horizontal lines depends on the frequency of the CRT, which varies among CRTs. Accordingly, the watches are either preset to operate with one particular type of CRT, or additional control is needed to enable the watch to communicate with different types of CRTs.

Another drawback of the Data-Link™ system is that it is limited to CRTs. LCD-based monitors such as those found in laptops do not emit enough light to be sensed by the watch.

Accordingly, there remains a need for a system for downloading data from a computer to an electronic personal organizer which is convenient, capable of wide use, and does not involve sophisticated procedures to initiate or conduct the data transfer task. It is an object of this invention to provide such as system.

SUMMARY OF THE INVENTION

This invention provides a convenient and easy system for exchanging executable instructions and data between a computer (such as a desk-top personal computer or a laptop computer) and a portable information device through the use of conventional memory drives, such as floppy disk drives and PCMCIA ports. These memory drives are widely available in computers, enabling the system of this invention to be widely practiced without special adapters or cords.

According to one aspect of this invention, the system includes a programmable portable information device which has a protective encasing with a form factor that is physically compatible with the computer memory drive. In one embodiment, the memory drive is a 3.5" floppy disk drive and the portable information device has the form factor of a 3.5" memory diskette. In another embodiment, the memory drive is a PCMCIA port and the portable information device has a form factor of a PCMCIA card. The uniquely configured portable information device is therefore able to be inserted into or removed from a standard computer memory drive.

The portable information device also has a processor, a memory to store instructions and data, and a signal interface to produce and detect signals which are electronically compatible with the computer memory drive. Preferably, the portable information device further comprises a keypad and a flat panel display provided on the exterior of the protective encasing, but within the form factor so as not to interrupt the insertion of the portable information device into the memory drive.

With the portable information device of this invention, a user can simply sit down at his/her computer and insert the device into the memory drive. When inserted, communication between the portable information device and computer is automatically initiated. The portable information device receives executable instructions and/or data from the computer via the computer memory drive and transfers other data back to the computer the same way. This permits the computer and portable information device to simultaneously update each other's data with the most current scheduling and task information that the user might have entered on the different components.

The portable information device stores the executable instructions and/or data received from the computer in its memory. The instructions and new data are then used by the portable information device when it is removed from the computer memory drive. When the user is finished at the computer, he/she simply removes the personal information device from the memory drive and carries it to various appointments. The portable information device has its own power supply and is operable to organize tasks, remind the user of important dates, and perform any other function of a personal organizer. While away, the user can enter information using the keypad, or read scheduling information on the flat panel display. The portable information device can also be equipped with an FM receiver for receiving paging information, a voice recognition mechanism to enable the user to enter data orally, and a sound generator which can produce tones for dialing numbers or reminder alarms.

According to another aspect of this invention, a method for exchanging executable instructions and/or data between a computer and a portable information device is described. Additionally, a method for detecting the presence of a portable information device in a memory drive is described.

BRIEF DESCRIPTION OF THE DRAWINGS

The same reference numerals are used throughout the disclosure to reference like components and features.

DETAILED DESCRIPTION OF THE PREFERRED EMBODIMENT

Figure 1:
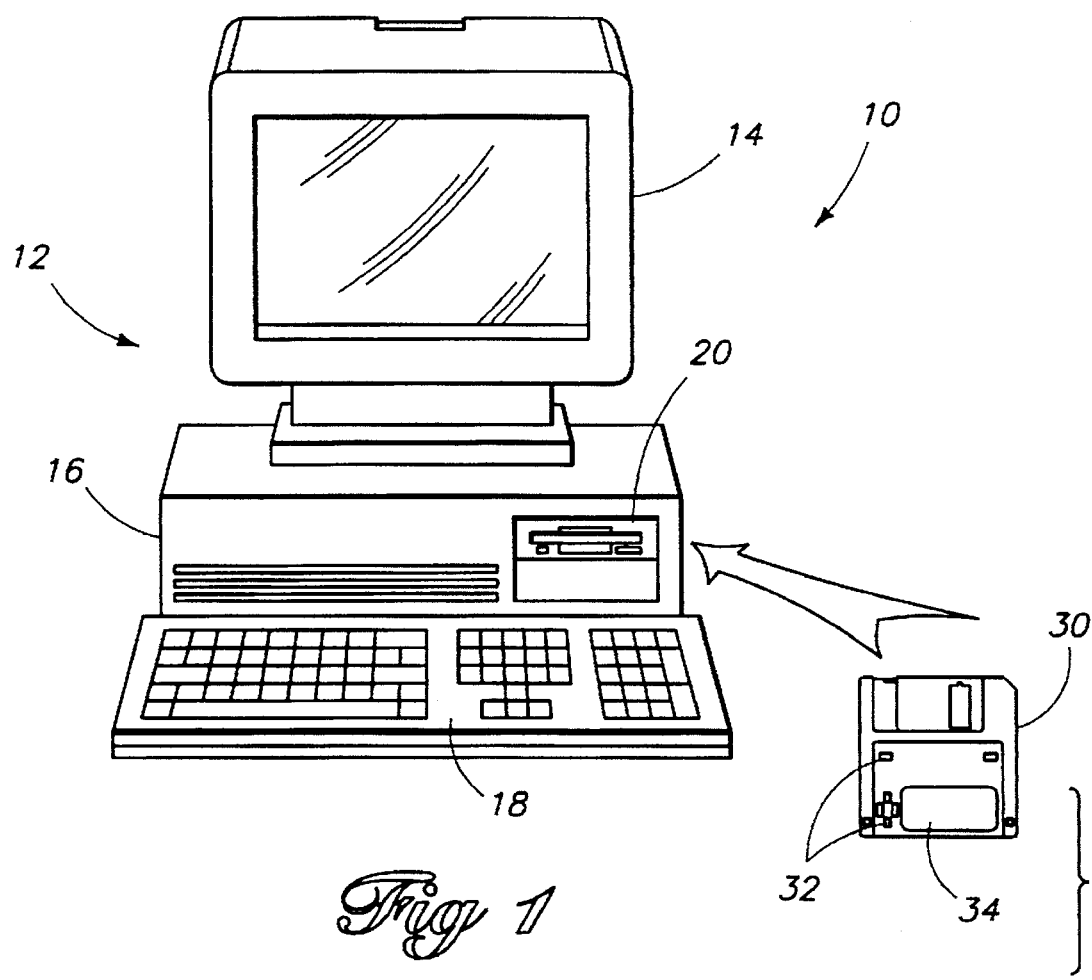
FIG. 1 is a diagrammatic illustration of a system for exchanging data between an desk-top personal computer and a portable information device according to one embodiment of this invention.

FIG. 1 shows a system 10 according to one embodiment of this invention. System 10 includes a computer system 12 having a visual display monitor 14, a central processing unit (CPU) 16, and a keyboard 18. Although not shown, other input devices may be used in addition to, or in place of, the keyboard, such as a mouse or trackball. CPU 16 has a computer memory drive 20 in the form of a standard 3.5" floppy disk drive. The floppy disk drive 20 is of conventional construction, having a magnetic read/write head and spindle for accessing a compatible 3.5" memory diskette. The illustrated computer system is an IBM®-compatible system, although other architectures, such as Apple®-compatible systems, can be employed.

CPU 16 preferably has a microprocessor capable of running an operating system that supports a graphical environment, such as Windows® 3.1 and Windows® NT from Microsoft Corporation, although other microprocessors of less processing capability can be employed. Example preferred microprocessors include a 386, 486, or Pentium™ microprocessor produced by Intel Corporation.

System 10 also includes a personal electronic portable information device 30 which resembles a memory device, like a 3.5" floppy diskette. Portable information device (PID) 30 is not a memory device at all, but instead is a small, portable, electronic apparatus that has processing capabilities, power resources, and rewritable memory capacity. Portable information device 30 has an input mechanism in the form of keypad 32 and a flat panel display 34. PID 30 is capable of maintaining personal scheduling information such as appointments, tasks, phone numbers, flight schedules, alarms, birthdays, and anniversaries, as well as other limited processing tasks.

PID 30 is physically sized like a 3.5" diskette and is electronically compatible to communicate with 3.5" disk drive 20, but the PID has no rotating memory medium. Rather, PID 30 is configured with solid state electronics and integrated circuitry that emulate a memory device so that the device acts as a memory device from the perspective of floppy disk drive 22. When the PID 30 is inserted into disk drive 20, the computer can download executable instructions and/or data to the PID to effectively program it to perform various operations. More particularly, the operating system of CPU 16 provides such instructions to PID 30 using an otherwise conventional disk drive 20. Floppy disk drive 20 has a magnetic read/write head which expects to transfer data to and from a rotating magnetic medium in a compatible diskette. To fool the disk drive, PID 30 includes a magnetic medium-emulating transducer which lies adjacent to the read/write head of floppy disk drive 20 when the PID is inserted therein. This transducer generates magnetic signals that simulate a rotatable magnetic medium to communicate with the read/write head of the computer disk drive. These signals can be in the form of magnetic and/or electronic signals that are familiar to the disk drive read/write head. As a result, the read/write head of the disk drive can communicate with the transducer of the PID, thereby enabling communication between the portable information device 30 and the computer system 12 via conventional memory drive 20.

Using the same memory interface, PID 30 can likewise transfer data back to the computer CPU 16. As a result, the user can simply insert the PID into the disk drive, and the PID and computer can respectively update each other's data to maintain current and consistent information for the user. Data entered into the user's personal computer can be downloaded to the PID, and information entered while away from the office on the PID can be uploaded to the computer. The system therefore helps prevent inconsistent and conflicting data that might otherwise occur as a result of maintaining dual scheduling programs.

Figure 2:
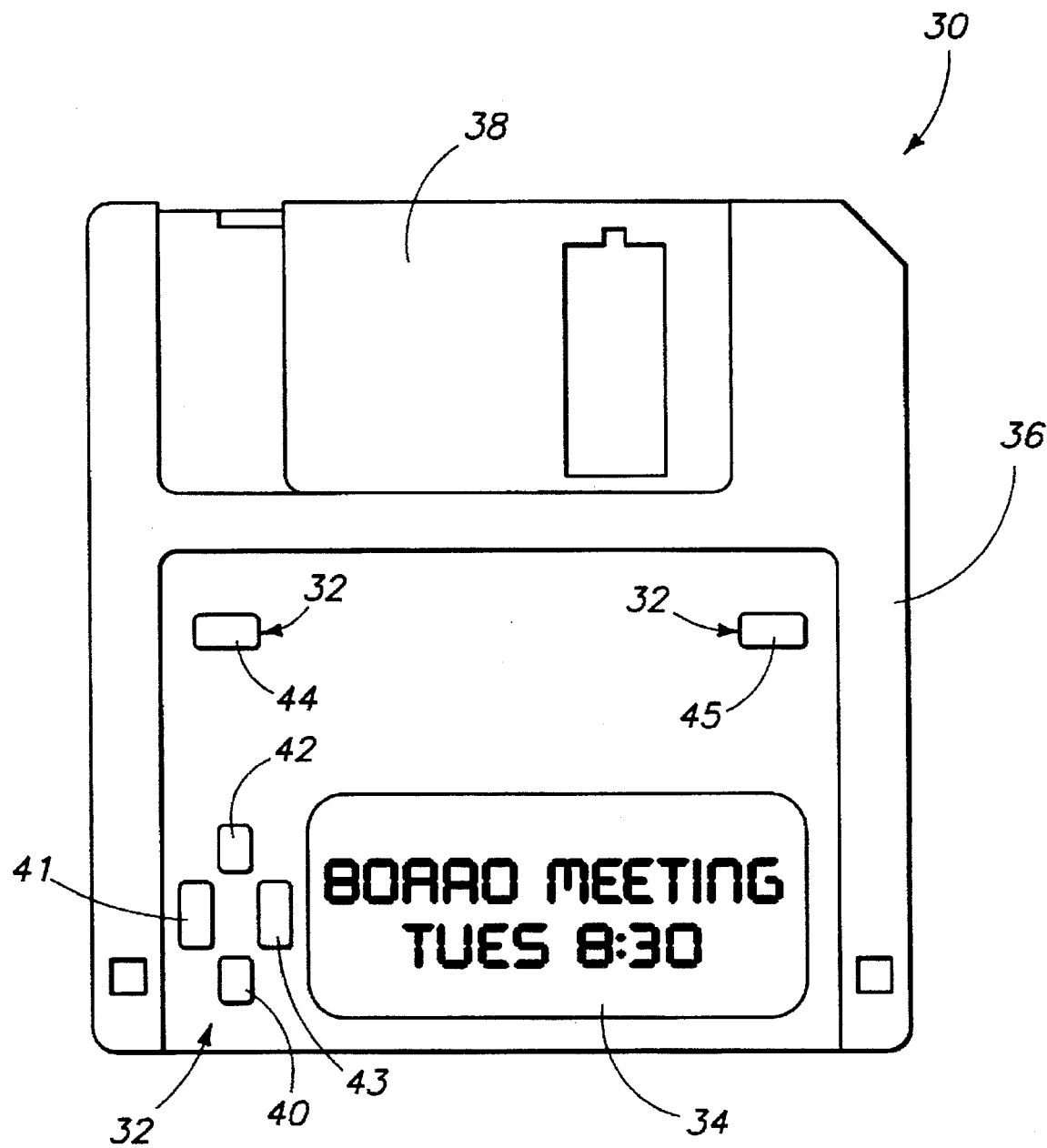
FIG. 2 is a front plan view of a portable information device that is sized and configured to emulate a 3.5" memory diskette according to one implementation of this invention.

FIG. 2 shows portable information device 30 in more detail. It includes a protective encasing 36 having a form factor compatible with the computer disk drive. In the illustrated embodiment, the form factor of encasing 36 is that of a 3.5" floppy diskette. The encasing 36 includes a slidable cover 38 which is spring biased to the closed position, as shown, but can be opened to reveal the interfacing transducer when the PID is inserted into the disk drive.

PID 30 further includes a keypad 32 which is accessible from the exterior of encasing 36 to permit a user to enter information. For instance, the user might wish to enter data concerning event schedules or meeting times, or the user might enter control commands which cause the PID to operate in a desired function or mode. In the illustrated embodiment, keypad 32 has actuatable keys 40–45 arranged on the exterior of the encasing. Keys 40–43 form a four button directional controller in one mode of operation. These keys can also function as data entry keys in other modes of operation. Key 44 is a mode control button, and key 45 is a power button. This arrangement, and the number of keys, are provided for example purposes. Many other configurations are possible.

Keys are 40–45 are preferably constructed as depressible elastomeric keyswitches which generate detectable signals when an external force is applied thereto, and then rebound to the non-depressed position when the force is removed. However, other pressure sensitive or contact sensitive keyswitches can alternatively be employed. The keys rise only an insignificant distance from the surface of the encasing so that the keypad 32 remains within the 3.5" form factor. In this manner, the keypad does not interfere with insertion of the PID into the disk drive.

Portable information device 30 also has a flat panel display 34 positioned to be visible from the exterior of protective encasing 36. Display 34 is mounted such that its upper surface is approximately coplanar with the upper surface of encasing 36. The flat panel display is therefore contained within the form factor of the encasing so that it does not impede or prevent insertion of the PID into the disk drive.

Preferably, screen 34 is a flat panel, touch screen LCD (Liquid Crystal Display) which can both display information, such as the example text "BOARD MEETING TUES 8:30" shown in FIG. 2, as well as permit the user to enter information through point contact with the screen. In another implementation, a touch screen LCD can be used exclusively as both the input mechanism and the display, and the keypad 32 can be eliminated.

Figure 3:
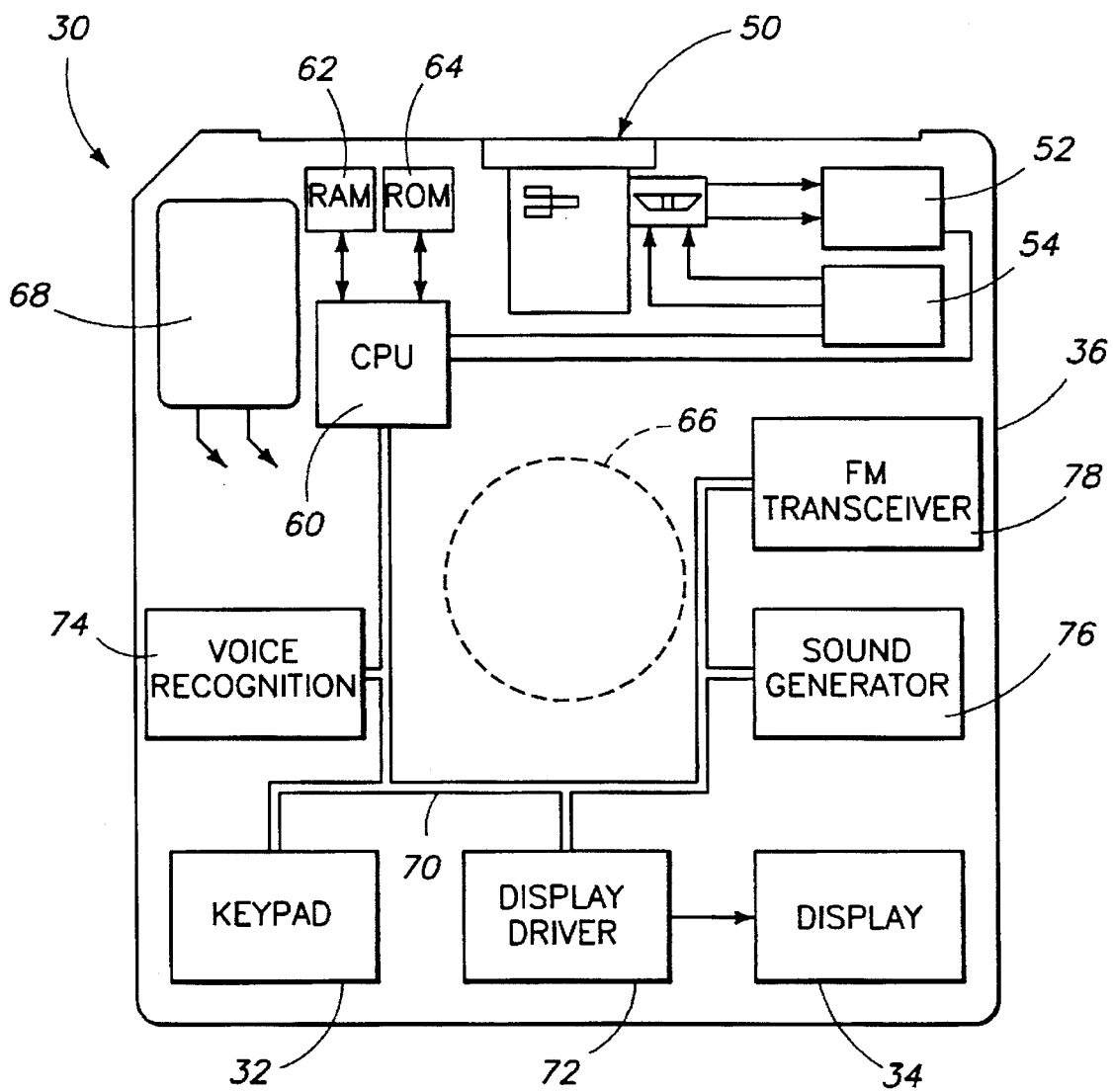
FIG. 3 is a functional schematic of the portable information device of FIG. 2.

FIG. 3 shows a functional block diagram of portable information device 30 according to one embodiment of this invention. As noted above, to fool the disk drive's magnetic read/write head, PID 30 includes a magnetic medium-emulating transducer 50 positioned at the slot in encasing 36 to lie adjacent to the read/write head. Transducer 50 has supporting circuitry in the form of signal processor 52 and D/A converter 54 which enable the transducer 34 to receive and generate magnetic signals that simulate a rotatable magnetic medium for communication with the read/write head. This transducer-based front end is provided in a commercially available product sold under the name SmartDisk™ by SmartDiskette, a Brittish-based company. The transducer employed in the SmartDisk™ is described in a German Patent Application No. DE 40 36 336 A1.

PID 30 has a processor or CPU 60, which is preferably an 8-bit microcontroller. According to one of its functions, CPU 60 is coupled to transducer 50 to control data I/O with the floppy disk drive. RAM (Random Access Memory) 62 and ROM (Read Only Memory) 64 are coupled to CPU 60 to provide memory support for various microcontroller functions. As an example, RAM 62 is approximately 64 Kbytes and ROM 64 is approximately 128 Kbytes. RAM 62 is preferably a non-volatile RAM, such as a battery-backed RAM, which can maintain data for scheduled events and appointments even after PID 30 is turned off. ROM 64 is preferably a multi-write ROM, such as an EEPROM, so that it can be reprogrammed as desired. According to this construction, CPU 60 receives executable instructions and/or data from the computer via the computer disk drive and transducer 50 when the PID is inserted into the computer disk drive. Processor 60 loads the executable instructions and/or data into the memory 62, 64.

In a preferred embodiment, CPU 60 has an internal clock and timing circuitry to coordinate the data transfer via transducer 50 to and from the floppy disk drive. In another embodiment, however, the PID 30 includes a rotatable hub positioned in recess 66 and a hub velocity sensor to measure the hub's rotational speed. The hub velocity sensor and transducer are then used to control generation of the magnetic signals in the transducer based in part on the measured speed of the rotating hub. By monitoring the hub's velocity and position as driven by the spindle and by detecting the magnetic signals from the read/write head, the processor can interpret these normal memory storage commands from the computer disk drive and translate them into information usable by the adapter or smart card.

Portable information device 30 has a battery 68 to supply power to the electronic components, including processor 60, transducer 50 (and signal processor 52 and D/A converter 54), and memory 62, 64. Preferably, battery 68 is a long lasting button-cell battery that fits conveniently within encasing 36, and provides energy for long periods of time before replacement.

PID 30 has an internal multi-bit conductor 70 which provides the signal interface between CPU 60 and other electronic components. Preferably, conductor 70 is an 8-bit bus. Keypad 32 is coupled to bus 70 to supply electronic signals to CPU 60 in response to actuation of keys 40–45 (FIG. 2). When the PID is removed from the disk drive, the user can enter data or control commands using keypad 32.

This information is supplied to processor 60 via bus 70 where the information is operated on according to the executable instructions and data stored in RAM 62 and ROM 64. Any resultant output information to be presented in visual form to the user is supplied from CPU 60, over bus 70, to a display driver 72 where the information is converted into image data for display 34.

Portable information device 30 has a voice recognition mechanism 74 which is coupled to processor 60 via bus 70. Voice recognition mechanism 74 is preferably a single integrated circuit chip which converts an audio vocal pattern of the user into electronic signals used by the processor. The voice recognition chip permits the user to orally enter information by simply speaking into the PID 30. The voice recognition mechanism can be configured to record brief statements by the user, and then play them back at a later time. Alternatively, the voice recognition mechanism can be configured to detect simple voice commands. For example, easy commands such as "Power On", or "Time of Day", or "Next Appointment", can be entered by voice, as opposed to using keypad 32, to promote convenience.

According to another aspect of this invention, PID 30 has an audio sound generator 76 which is coupled to the processor 60 via bus 70. The audio sound generator generates different and distinct audio sounds which are emitted from the portable information device. The audio sound generator 76 is preferably configured as a piezoelectric membrane device capable of generating distinct digit tones that can be recognized by the telephone system in response to electrical signals supplied from CPU 60. In this manner, the user can retrieve a telephone number from the PID RAM memory 62, have the number shown on display 34 to verify that it is the correct number, and then employ sound generator 76 to dial the telephone number while holding PID 30 adjacent to a pick up coil of a telephone handset.

The audio sound generator can also be used to produce distinct alarm sounds to notify the user of upcoming schedule events. For example, the alarm might be programmed to sound off at 15 minutes before a meeting.

It is noted that the sound generator 76 and voice recognition mechanism 74 might be integrated in some manner to share the same piezoelectric membrane device that is capable of both generating audio sounds in response to an electric signals (as in the case of alarms or alphanumeric digit tones), as well as produce electric signals in response to receiving audio sounds (as in the case of receiving and converting vocal sound waves into electric signals).

PID 30 is further equipped with an FM transceiver 78 which is coupled via bus 70 to CPU 60. FM transceiver is capable of receiving information via radio signals. For example, FM transceiver 78 can be employed to receive pager information, as is commonly carried to specially dedicated pagers via FM radio signals. As another example, FM transceiver 78 can be used to receive stock quotation information, similar to the Quotron® portable devices that are commercially available. If battery 68 has sufficient power, the FM transceiver 78 can also be used to transmit data back to a remote receiving unit, although the transmission range of the transceiver is rather limited. It should be noted that a suitable antenna can be arranged within encasing 36 so as not to interfere with other electronic components.

The electronic components are arranged within the encasing about circular recess 62. This recess accommodates the spindle of the disk drive when the optical signal transmitting device is inserted into the drive. Recess 62 does not extend the entire width of the encasing, however, and thus bussing or low profile components can be arranged to overlap recess.

In addition to the form factor of a 3.5" diskette, the PID can be configured in other form factors of conventional memory drives.

Figure 4:
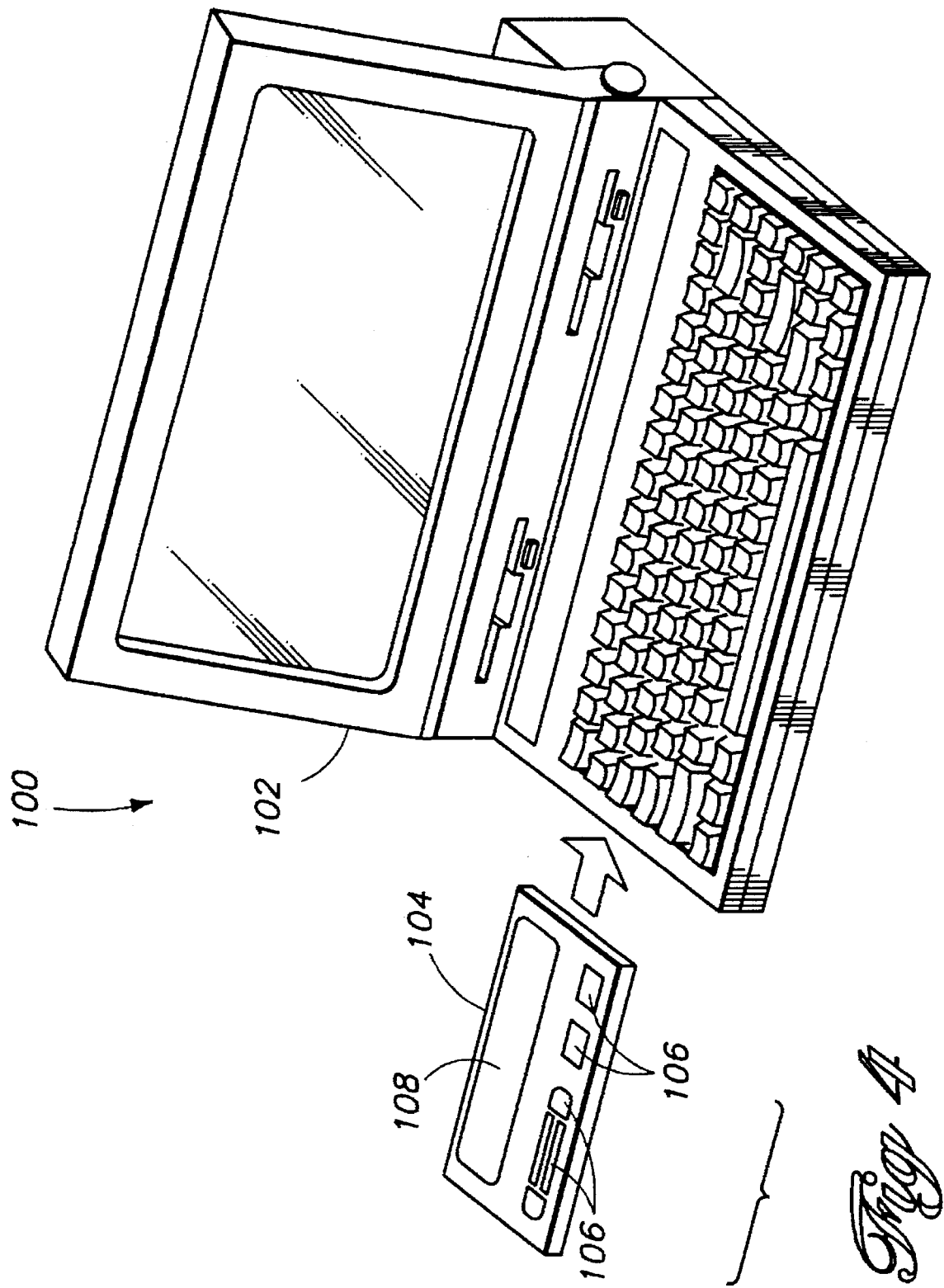
FIG. 4 is a diagrammatic illustration of a system for exchanging data between a laptop computer and a portable information device according to another embodiment of this invention.

FIG. 4 shows a system 100 according to another embodiment of this invention. System 100 includes a conventional laptop computer 102 having a standard PCMCIA (Personal Computer Memory Card International Association) memory drive or port (not shown in this angle). In this embodiment, a portable information device 104 is provided in the form factor of a PCMCIA card. Similar to the above described PID that is implemented in the 3.5" diskette form factor, the PCMCIA form factor PID 104 has an input mechanism in the form of keypad 106, and a flat panel display 108 provided on the exterior of the encasing. Keypad 106 and display 108 are functionally mounted to be accessible by the user, but still within the PCMCIA form factor.

Figure 5:
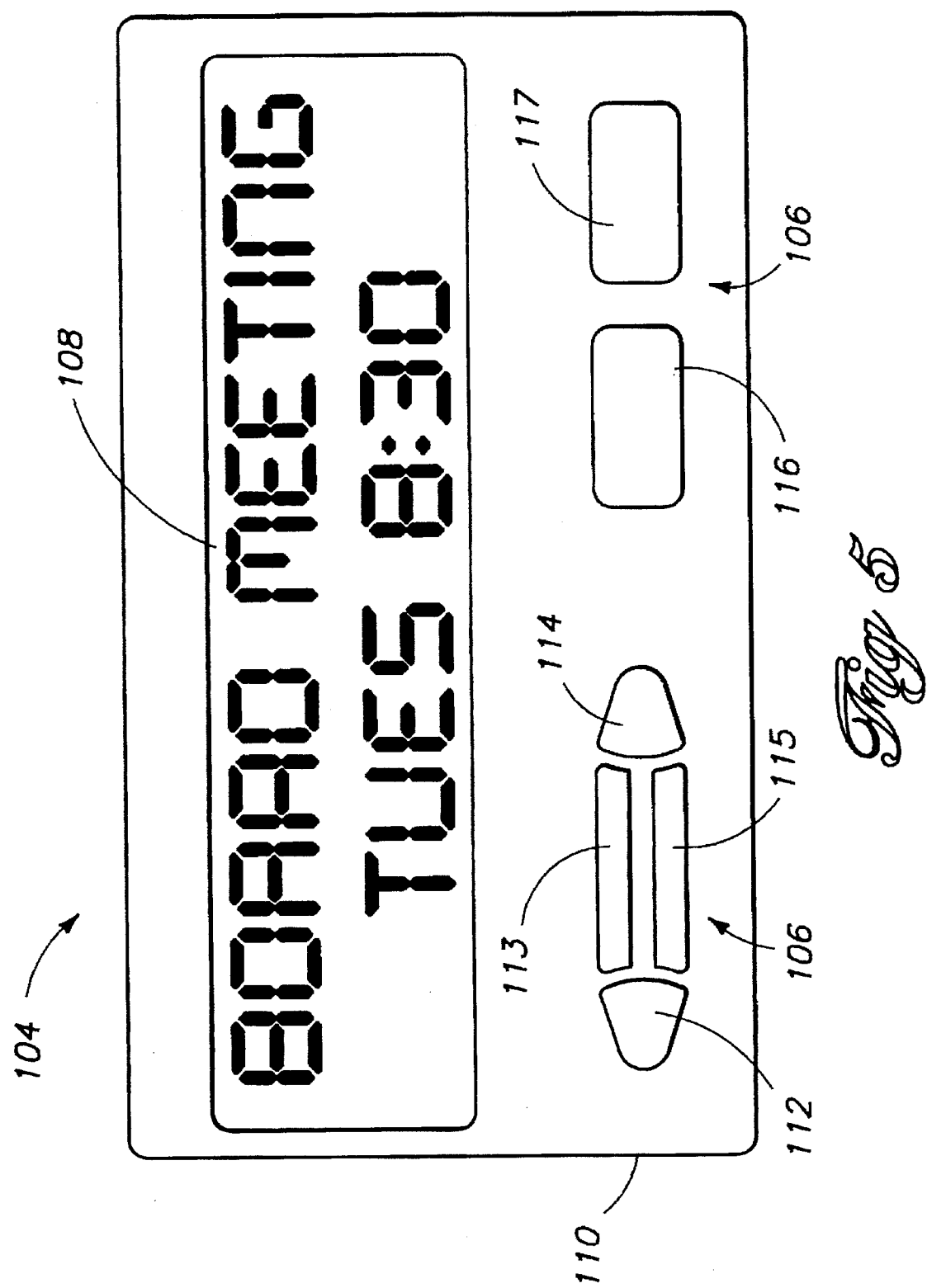
FIG. 5 is a front plan view of a portable information device that is sized and configured to emulate a PCMCIA card according to a second implementation of this invention.

FIG. 5 shows PID 104 in more detail. It includes a protective encasing 110 having a form factor compatible with a PCMCIA port. Keypad 106 has actuatable keys 112–117 arranged on the exterior of encasing 110. Keys 112–115 form a four button directional controller in one mode of operation, as well as performing other data entry functions in other modes of operation. Keys 116 and 117 provide modal control and power on/off functions. This arrangement, and the number of keys, are provided for example purposes. As above, the keys are preferably constructed as depressible elastomeric keyswitches, or as pressure sensitive keys (such as pressure sensitive resistor type keys). The keyswitches rise an insignificant distance from an upper surface of encasing 110 and do not interfere with insertion of the PID into the PCMCIA port.

Flat panel display 108 is mounted coplanar with the upper surface of encasing 110 so that it is visible from the exterior of protective encasing 110, yet within the form factor of the encasing. In this manner, the display does not impede or prevent insertion of the PID into the PCMCIA port.

Figure 6:
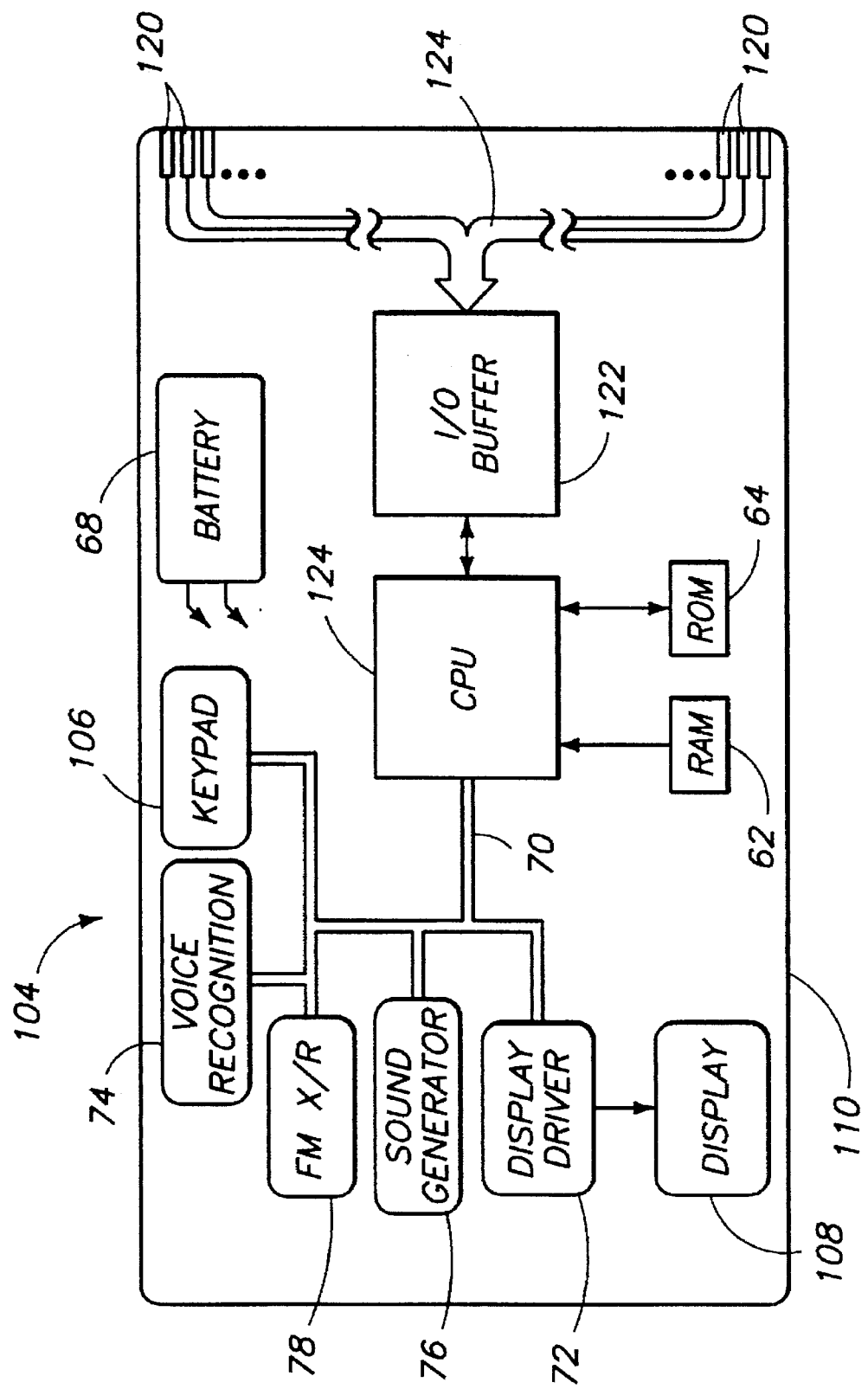
FIG. 6 is a functional schematic of the portable information device of FIG. 5.

FIG. 6 shows a functional block diagram of portable information device 104. It includes I/O connectors 120 positioned at one end of the encasing 110 to interface with corresponding connectors provided in the PCMCIA port of laptop computer 302. I/O connectors 120 are coupled to an I/O buffer 122 via internal I/O conductors 124. The remaining electronic components on PCMCIA-based PID 104 are essentially the same as that described above with respect to PID 30 in FIG. 3, and thus are only briefly mentioned here. I/O buffer 122 supplies I/O data received from laptop computer 302 to CPU 124. PID 104 further includes RAM 62, ROM 64, battery 68, internal bus 70, voice recognition mechanism 74, sound generator 76, FM transceiver 78, and display driver 72.

It is noted that the electronic implementation of PID 104, with the PCMCIA form factor, is less complicated than that of PID 30, with the floppy diskette form factor, because the signals from the laptop are output electrically in digital form directly into PID 104 and CPU 124. There is no magnetic coupling and hence, no transducer electronics in the PCMCIA-based implementation.

Figure 7:
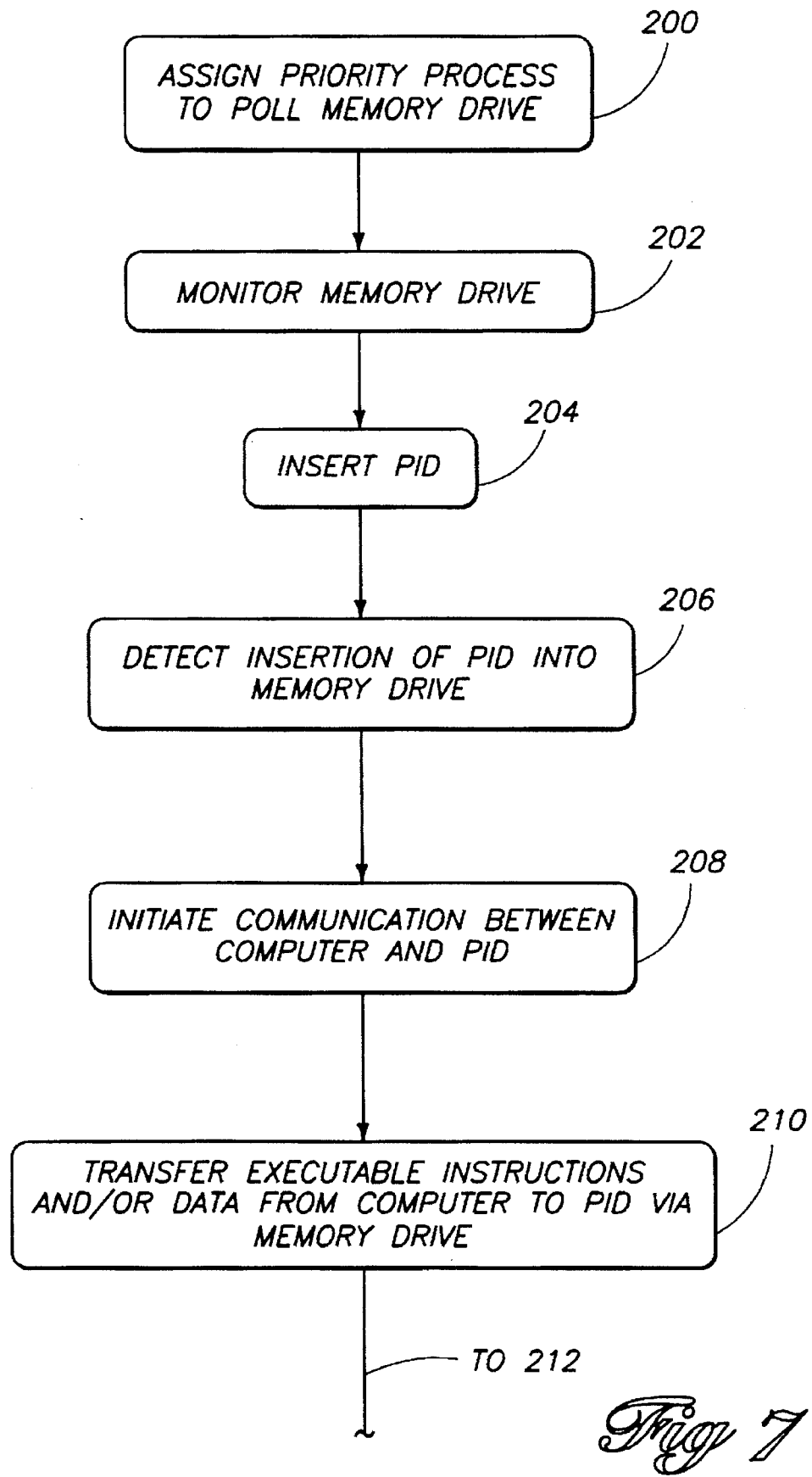
FIGS. 7 and 8 are a flow diagram of a method for exchanging executable instructions and/or data between the computer and the portable information device according to another aspect of this invention.
Figure 8:
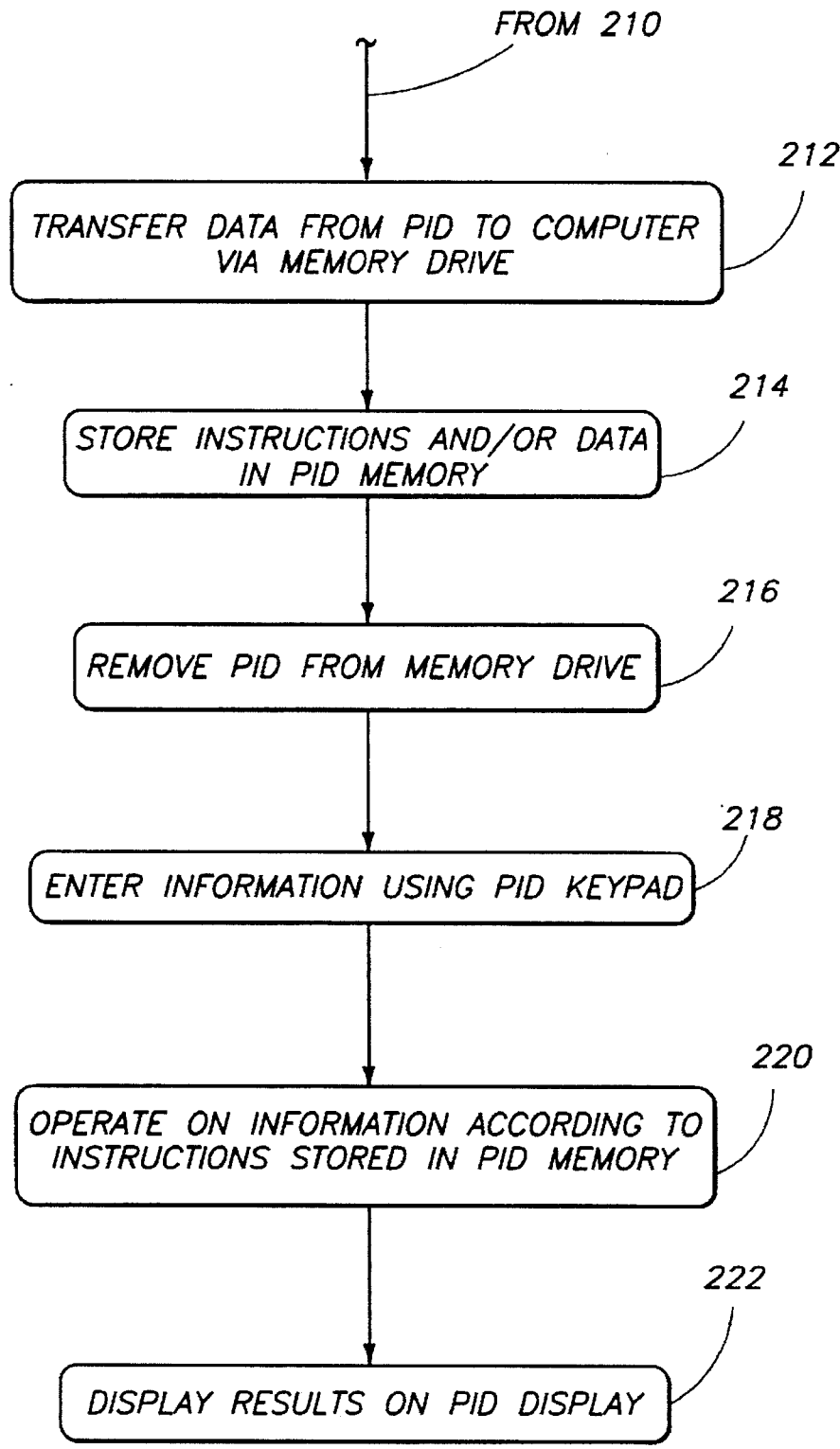

FIGS. 7 and 8 describe a method for exchanging executable instructions and data between a PID of this invention and the computer through conventional and widely available memory drives. For discussion purposes, this method will be described in the context of system 10 shown in FIGS. 1–3. At step 200, a low priority detection process is established within the operating system of computer CPU 16 that interacts with disk drive 20. The low priority detection process is assigned to poll the computer disk drive 20 to detect a presence of PID 30 when it is inserted into the drive 20. Such a process can be configured as a TSR (Terminate-and-Stay-Resident) program, or in the multi-tasking environment of Windows® NT, as a low priority thread.

According to one specific implementation, the low priority detection process can be coordinated with a screen saving process that controls output to display monitor 14 during periods of inactivity. The low priority detection process can be activated in conjunction with activation of the screen saving process.

The low priority process thereby monitors the memory disk drive (step 202 in FIG. 7). When PID 30 is inserted into disk drive 20 (step 204), the low priority detection process detects its presence and notifies the CPU operating system (step 206). CPU 16 then automatically initiates communication between computer system 12 and PID 30 (step 208). No input is required from the user.

At step 210 in FIG. 7, the computer system 12 transfers executable instructions and/or data to PID 30 via disk drive 20. Additionally, any recent data entered by the user into PID 30 can also be uploaded to computer system 12 via the same disk drive 20 (step 212 in FIG. 8). As a result, the system automatically updates the scheduling data resident on computer CPU 16 and that resident on PID 30. This reestablishes a dual system with duplicated and consistent scheduling data being provided by either the PC system 12 or PID 30.

At step 214, the executable instructions and/or data transferred to PID 30 are stored in one or both of the memories 62 and 64 (FIG. 3). More particularly, the system is designed to be capable of reprogramming PID 30 by downloading a new set of executable instructions or code that can operate within CPU 60 of PID 30. This code can be stored in ROM 64, or in non-volatile RAM 62. Also, the computer transfers data related to scheduling and appointments, which can be stored in RAM 62.

After the updating and any reprogramming is completed, the user can remove the PID from the disk drive (step 216). Once removed, the user simply uses the diskette shaped device as a portable personal organizer. The user can input data via keypad 32 (step 218). As described above, the PID can also receive voice commands and pager information, or emit alarm signals or telephone digit tones. These functions are performed by the PID CPU 60 according to the executable instructions stored in memories 62 and 64 after removal of the portable information device from the computer memory drive (step 220 in FIG. 8). Any resultant information can be displayed to the user via PID display 34 (step 222).

This invention therefore provides a convenient, easy-to-operate system for exchanging data between a computer and a portable information device through the use widely available, standard memory drives. The user simply inserts the PID into a compatible drive, and the operating systems of the computer and PID simultaneously update and coordinate each other's data to provide a comprehensive and consistent set of information for the user. Thereafter, the user removes the PID and carries the small pocket-sized device to various meetings or appointments.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A portable information device configured to receive executable instructions from a computer via a PCMCIA port, the portable information device comprising:

a protective encasing having a form factor compatible with the PCMCIA port, the encasing being insertable into and removable from the PCMCIA port;

I/O connectors positioned at one end of the encasing to interface with corresponding connectors provided in the PCMCIA port of the computer;

an input mechanism accessible from an exterior of the protective encasing to permit a user to enter information when the encasing is removed from the PCMCIA port, the input mechanism being within the form factor of the protective encasing;

a memory provided within the protective encasing;

a processor operatively coupled to the memory and to the I/O connectors, the processor receiving executable instructions and/or data from the computer via the PCMCIA port when the encasing is inserted into the PCMCIA port, the processor loading the executable instructions and/or data into the memory; and the processor also being coupled to receive the information entered by the user on the input mechanism when the encasing is removed from the PCMCIA port, the processor operating on the information according to the executable instructions stored in the memory.

2. A portable information device as recited in claim 1 wherein:

the input mechanism comprises a keypad having actuatable keys provided on the exterior of the encasing.

3. A portable information device as recited in claim 1 wherein:

the input mechanism comprises a touch screen display provided on the exterior of the encasing.

4. A portable information device as recited in claim 1 further comprising:

a flat panel display mounted on the exterior of the encasing, but contained within the form factor of the protective encasing.

5. A portable information device as recited in claim 1, further comprising:

an audio sound generator operatively coupled to the processor, the audio sound generator generating audio sounds which are emitted from the portable information device.

6. A portable information device as recited in claim 1, further comprising:

a voice recognition mechanism operatively coupled to the processor to convert an audio vocal pattern of the user into electronic signals used by the processor, the voice recognition mechanism permitting the user to orally enter information.

7. A portable information device as recited in claim 1, further comprising:

an FM receiver operatively coupled to the processor to receive information via FM radio signals.

8. A portable information device as recited in claim 1, further comprising:

a battery to supply power to at least one of the processor, the transducer, and the memory.

9. A portable information device configured to receive executable instructions from a computer via a PCMCIA port, the portable information device comprising:

a protective encasing having a form factor compatible with the PCMCIA port, the encasing being insertable into and removable from the PCMCIA port;

I/O connectors positioned at one end of the encasing to interface with corresponding connectors provided in the PCMCIA port of the computer;

a memory provided within the protective encasing;

a flat panel display visible from an exterior of the protective encasing, the flat panel display being within the form factor of the encasing;

a processor operatively coupled to the memory, the I/O connectors, and the flat panel display, the processor receiving executable instructions and/or data from the computer via the PCMCIA port when the encasing is inserted into the PCMCIA port and loading the executable instructions and/or data into the memory, the processor performing operations according to the executable instructions stored in the memory when the encasing is removed from the PCMCIA port and outputting any resultant information to the flat panel display for display to a user.

10. A portable information device as recited in claim 9 wherein:

the flat panel display comprises a flat panel, touch screen LCD.

11. A portable information device as recited in claim 9 further comprising:

a keypad having actuatable keys provided on the exterior of the encasing, the actuatable keys being within the form factor of the protective encasing.

12. A portable information device as recited in claim 9, further comprising:

an audio sound generator operatively coupled to the processor, the audio sound generator generating audio sounds which are emitted from the portable information device.

13. A portable information device as recited in claim 9, further comprising:

a voice recognition mechanism operatively coupled to the processor to convert an audio vocal pattern of the user into electronic signals used by the processor, the voice recognition mechanism permitting the user to orally enter information.

14. A portable information device as recited in claim 9, further comprising:

an FM receiver operatively coupled to the processor to receive information via FM radio signals.

15. A portable information device as recited in claim 9, further comprising:

a battery to supply power to at least one of the processor, the transducer, and the memory.

* * * * *